United States Patent [19]

Beckwith, Jr. et al.

[11] Patent Number: 5,140,532
[45] Date of Patent: Aug. 18, 1992

[54] DIGITAL MAP GENERATOR AND DISPLAY SYSTEM

[75] Inventors: Paul B. Beckwith, Jr., Indialantic; Kent P. Bascle, Melbourne; Luen C. Chan, Indian Harbour Beach; Wayne E. Basta, Palm Bay, all of Fla.

[73] Assignee: Harris Corporation, Melbourne, Fla.

[21] Appl. No.: 242,125

[22] Filed: Sep. 9, 1988

Related U.S. Application Data

[60] Division of Ser. No. 168,437, Mar. 15, 1988, which is a division of Ser. No. 641,179, Aug. 15, 1984, abandoned, which is a continuation of Ser. No. 224,242, Jan. 13, 1981, abandoned.

[51] Int. Cl.$^5$ .............................................. G06F 15/66
[52] U.S. Cl. .................................... 395/101; 340/747; 340/971; 382/56
[58] Field of Search ...................... 364/518, 521, 522; 340/729, 971, 979, 747, 750, 734, 728; 382/55, 56, 21

[56] References Cited

U.S. PATENT DOCUMENTS

| | | | |
|---|---|---|---|
| 4,152,766 | 5/1979 | Osofsky et al. | 364/515 |
| 4,295,135 | 10/1981 | Sukonick | 340/734 |
| 4,489,389 | 12/1984 | Beckwith et al. | 364/522 |
| 4,520,506 | 5/1985 | Chan et al. | 382/56 |
| 4,539,704 | 9/1985 | Pastor | 382/55 |
| 4,583,185 | 4/1986 | Heartz | 364/521 |
| 4,660,157 | 4/1987 | Beckwith et al. | 364/522 |
| 4,734,690 | 3/1988 | Waller | 340/729 |
| 4,751,660 | 6/1988 | Hedley | 364/518 |
| 4,801,207 | 1/1989 | Williams | 356/376 |
| 4,833,721 | 5/1989 | Okutomi et al. | 382/21 |

*Primary Examiner*—Gary V. Harkcom
*Assistant Examiner*—Phu K. Nguyen
*Attorney, Agent, or Firm*—Evenson, Wands, Edwards, Lenahan & McKeown

[57] ABSTRACT

A digital information storage and read-out system in which digital elevation and cultural terrain data is read from a magnetic tape in compressed form into an intermediate memory which operates as a speed buffer memory. The data in the intermediate memory is read out to a reconstruction processor in which the compressed data is reconstructed and applied to a scene memory. A navigation computer determines the instantaneous position of a vehicle with respect to the terrain and controls the reading of data into the scene memory in blocks with the vehicle position occupying a center of scene location. In order to provide a heading up display of the terrain, the data in the scene memory is raed out at an angle to its north-up storage orientation and interlaced scanning of pixel data in the scene memory improves resolution and enhances line display. The data read out of the scene memory controls the generation of video control signals to effect a display of the elevation and cultural data as a moving map related to the vehicle position.

4 Claims, 12 Drawing Sheets

DIGITAL MAP GENERATOR AND DISPLAY SYSTEM

This is a divisional of application Ser. No. 168,437, filed Mar. 15, 1988, which is a divisional of application Ser. No. 641,179, filed Aug. 15, 1984, now abandoned, which is a continuation of application Ser. No. 224,242, filed Jan. 13, 1981, now abandoned.

FIELD OF THE INVENTION

The present invention relates in general to information display systems, and more particularly, to a digital system for the display of elevation and cultural terrain data so as to provide a dynamic visual map of the terrain over which a vehicle, such as an aircraft, is passing, or a simulation thereof.

BACKGROUND OF THE INVENTION

In the navigation of an aircraft or other vehicle over a planned route, contour maps are typically relied upon to indicate the configuration of the terrain over which the aircraft passes, and the pilot of the aircraft utilizes the data provided by such contour maps in conjunction with instrument readings and visual observation of the terrain in determining the altitude and course of the aircraft as it passes from point to point along the route. However, for low altitude flying, such as might be encountered in a helicopter or other low flying aircraft, for example, an instantaneous indication of the details of the terrain over which the aircraft passes is essential to the quick reaction required in the guiding of the aircraft over a terrain which may provide rapidly changing contours and other obstacles to the flight of the aircraft.

Weather conditions which result in poor visibility for an aircraft or over-land vehicle also hinder the use of simple contour maps for purposes of navigation. Thus, the problems which have been experienced to date in the navigation of helicopters at so-called nap-of-the-earth (NOE) altitudes have been formidable especially under conditions of limited visibility. Even where visibility is not a factor, the navigation problems with NOE flight do not have simple solutions. Thus, if a map were available which could readily identify the instantaneous position of the aircraft or vehicle and display the terrain in the immediate vicinity of the aircraft, and if the map would always be oriented in the direction of the aircraft heading such that upcoming terrain could be easily identified, and if any additional information the pilot required was accurately identified thereon, then the NOE effectiveness of the pilot would be greatly enhanced.

Accordingly, various systems have been proposed heretofore, including radar scanning systems and systems using preprocessed films of terrain over which an aircraft is to pass, for providing to the pilot a display which simulates that which he would visualize if he were able to actually view the terrain over which the aircraft is passing. Unfortunately, such systems have not been entirely satisfactory in that they are often quite complex and are not capable of providing the detail insofar as elevation and cultural data is concerned which is required by the pilot of the aircraft for proper guidance. Further, in systems in which preprocessed films are used to provide the navigational display data, only a flight over a specific path correlated to the information provided on the film is possible.

To overcome these problems, it has been suggested that a computer-controlled system including a large memory capacity be provided for the storage of terrain data in digital form. However, such a solution requires an extremely-large memory capacity to store all of the data necessary for the display of both elevation and cultural features for a sufficiently-large area to accommodate the required manuverability of the aircraft. In addition, such systems typically require a scene or display memory for storage of the data to be displayed, and the update or refresh of this memory to accommodate changes in display data in response to movement of the aircraft and changes in heading thereof have resulted in poor picture quality due to the slow speed of these update or refresh operations.

BRIEF DESCRIPTION OF THE INVENTION

The present invention proposes a system for the dynamic display of terrain data which is stored in digital form and which may be viewed on a cathode ray tube display in the form of a moving map which is automatically oriented under control of the aircraft's navigational computer system to the instantaneous position of the aircraft with a heading-up disposition. The system is designed to display both elevation and cultural data as well as symbology and alphanumeric data, providing the maximum of information to the pilot to aid in his navigation and control of the aircraft.

In order to solve the problem of storage of large amounts of terrain data, a new approach to storing this elevation and cultural grid data is used in accordance with this invention that involves compression of the data in the transform domain so as to minimize map contour and cultural data storage requirements. By this approach, the digital grid data points are stored after being subjected to a data compression algorithm Which may be of the type used in many video bandwidth compression systems. One choice is the hybrid discrete cosine transform (DCT) compression algorithm, with differential pulse code modulation (DPCM) being used to transmit the DCT coefficient differences between each row of grid points. In this way, during memory update, selected in-between data element (pixel) points can be filled in by interpolation directly from the DCT transform in one direction and in the other direction, the DPCM data stored will be interpolated to provide data to fill in intermediate lines.

According to the present invention, there is provided a system which uses compressed digitized terrain data stored on a cassette tape as the information source for the display of the data on a cathode ray tube screen, for example. By using a transform compression technique, sufficient digitized data to fit the required terrain area may be accommodated on a single cassette tape. The terrain data is then accessed from the tape as a function of the aircraft position obtained from the standard navigation sensors which are provided as part of the conventional navigation system of the aircraft. The display format identifies the aircraft position as a fixed point on a cathode ray tube screen and the terrain data is automatically rotated and translated by the system relative to the aircraft heading to provide a continuous heading-up display of the terrain over which the aircraft is passing.

Conventional methods of rotating the elevation data from a north-up referenced axis to an aircraft heading-up axis have been complex and have required considerable processing time to rotate a full display frame of data in accordance with the aircraft heading. In this regard, this limitation on the display update rate as provided by conventional methods also affects the display quality in that display update rates of less than thirty frames per second produce objectionable strobed motion between frames and a consequent deterioration of the quality of the display. However, these problems are solved in accordance with the present invention by utilizing a unique technique in which the stored frame of data is maintained at all times within a scene memory with a north-up referenced axis and only the read addresses applied to this memory are rotated to effect a rotation of the display frame of data which is being read out of that memory. This novel approach permits a display update rate of sixty fields per second, which clearly avoids any strobing effects on the data display and totally eliminates any need to update the contents of the scene memory merely in response to a change in heading of the aircraft.

Increased speed is also achieved in the updating of data in the scene memory by a virtual addressing technique which avoids the need to continuously change the entire contents of the memory. Data is accessed from the cassette tape or other data source and stored in memory in discrete blocks which are related to the instantaneous center of display position occupied by the aircraft. However, as blocks of data in the memory become unnecessary due to movement of the aircraft, for example, new blocks of data are written into memory areas previously occupied by unwanted blocks without regard to the positional relationship of the new blocks in the stored scene. However, by use of a virtual addressing scheme, the system is able to relate the physical addresses to the virtual or scene addresses for purposes of readout and display. Thus, as the scene changes, only those peripheral blocks in memory need be replaced, making high speed update of the memory possible.

A further feature of the present invention relates to the provision of a topographic display in which shades of gray are utilized to identify elevation levels and different colors are used to highlight cultural features. Thus, where different amplitude levels are utilized in the digital signals to designate different shades of gray or different elevational levels in the display of elevational data, different colors are utilized in the same way to designate different types of cultural data, such as roads, cities, vegetation, water, and the like.

It is therefore a principal object of the present invention to provide an information display system for providing a dynamic display of terrain over which an aircraft is passing on the basis of stored elevation and cultural data relating to that terrain.

It is a further object of the present invention to provide a system of the type described in which elevation and cultural data is made available by means of a storage arrangement, such as a cassette tape or a bubble memory, on which this terrain data is stored in the form of digital data compressed in the transform domain.

It is another object of the present invention to provide a system of the type described in which the updating of data in memory can be accomplished at high speed through a virtual addressing scheme which avoids the need for total updating of the memory on a periodic basis.

It is still a further object of the present invention to provide a system of the type described in which the need to re-orient the reconstructed data in memory to correspond to a heading-up orientation to be displayed is avoided, thereby permitting the data in memory to be retained at a given orientation regardless of changes in vehicle heading.

It is still another object of the present invention to provide a system of the type described which is capable of providing a moving map display of terrain over which a vehicle is passing with high resolution and including all cultural and alphanumeric data needed to indicate those desired characteristics of that terrain required for successful navigation of the vehicle.

It is another object of the present invention to provide a system of the type described in which line enhancement and increased resolution of the display are accomplished in a simple way through use of interlace scanning techniques.

These and other objects, features and advantages of the present invention will become more apparent from the following detailed description of a preferred embodiment as shown in the accompanying drawings.

DETAILED DESCRIPTION OF THE INVENTION

Figure 1:
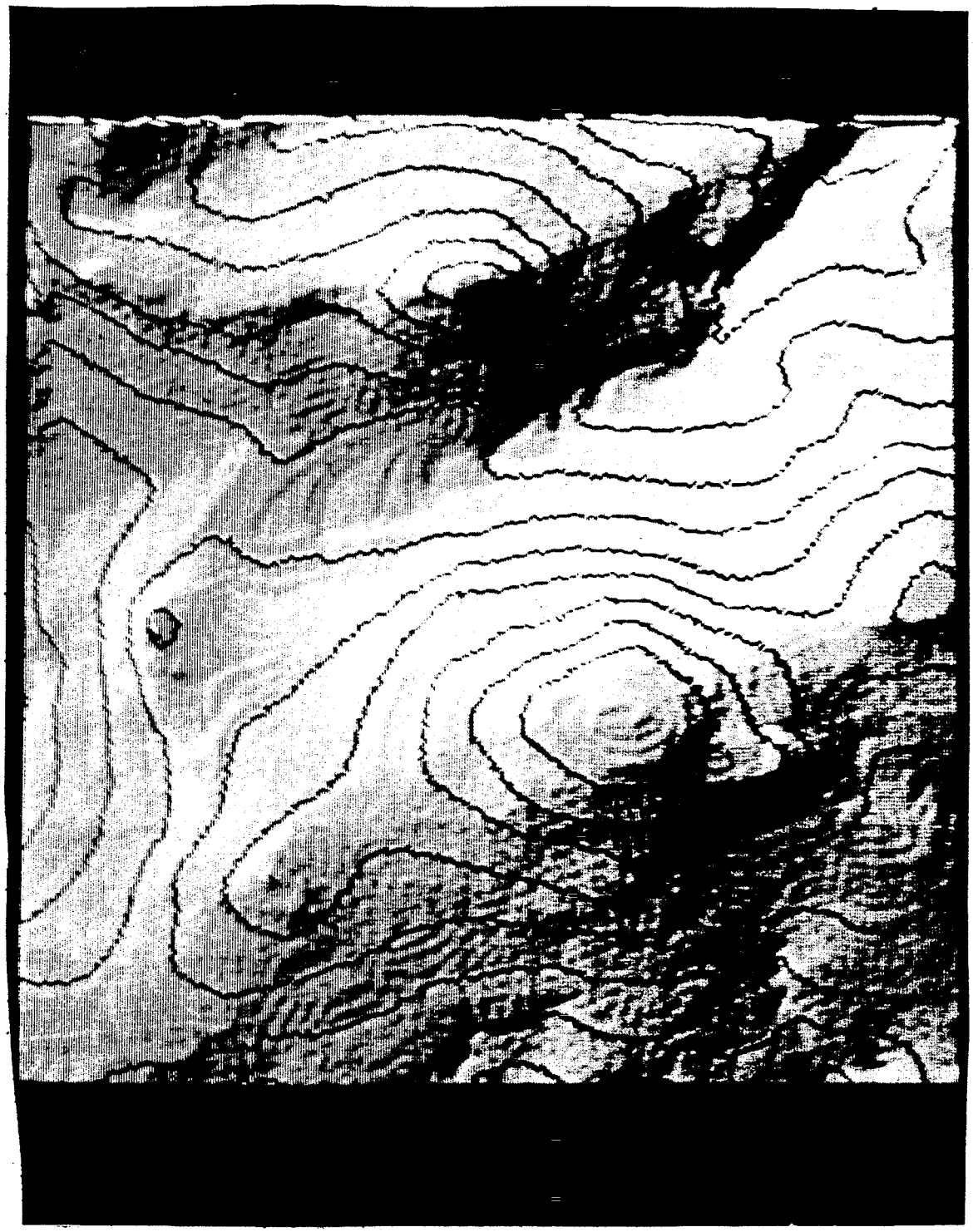
FIG. 1 is a photograph of a cathode ray tube display of terrain as produced in accordance with the present invention, however, without the addition of cultural data.

FIG. 1 is a photograph of a cathode ray tube display of elevation data reproduced from a video tape by the system of the present invention. In this photograph a rectangle appears at the "center of display" location representing the vehicle and the arrow within the rectangle indicates the vehicle heading. In this regard, the present invention is particularly suitable for use with aircraft, and for this reason, this description is directed primarily to the guidance of aircraft; however, it will be recognized that the present invention has equal application to all types of vehicles including over-land vehicles.

As seen in FIG. 1, the elevations of the terrain are marked off in distinct levels by contour lines, and with the addition of slope shading an apparent three-dimensional effect is given to the display similar to that provided by a relief map, so that the pilot of the aircraft depicted by the rectangle can easily guide the aircraft over the terrain at low altitudes even with limited or poor visibility. To this display of elevation data, the present invention is capable of selectively adding cultural data, such as roads, streams, cities, lakes and the like, through the selection of basic colors for the appropriate pixels (picture elements of the display), and alphanumeric data may also be added to provide the maximum information relating to the displayed terrain.

One of the basic problems faced by systems which attempt to provide a visual display of terrain on the basis of stored digital information relates to the ability to store sufficient information to provide all of the elevation and cultural features for a significant area of terrain over which the aircraft might wish to travel without limitation to a single predetermined flight path. In this regard, efficient digital terrain data storage is absolutely essential to a reduction of the capacity of the data base memory required for each aircraft if the on-board system is to be reduced to a practical size. The basic objective in this regard is to provide a practical aircraft operating range on a single large cassette tape that can be mission updated. This is accomplished in accordance with the present invention by utilizing a transform compression approach which serves to convert the spatial elevation points to the frequency domain. In this regard, the individual frequency coefficients are stored with minimum word lengths since the resulting quantizer errors tend to cancel and are smoothed over a large terrain area.

Figure 2:
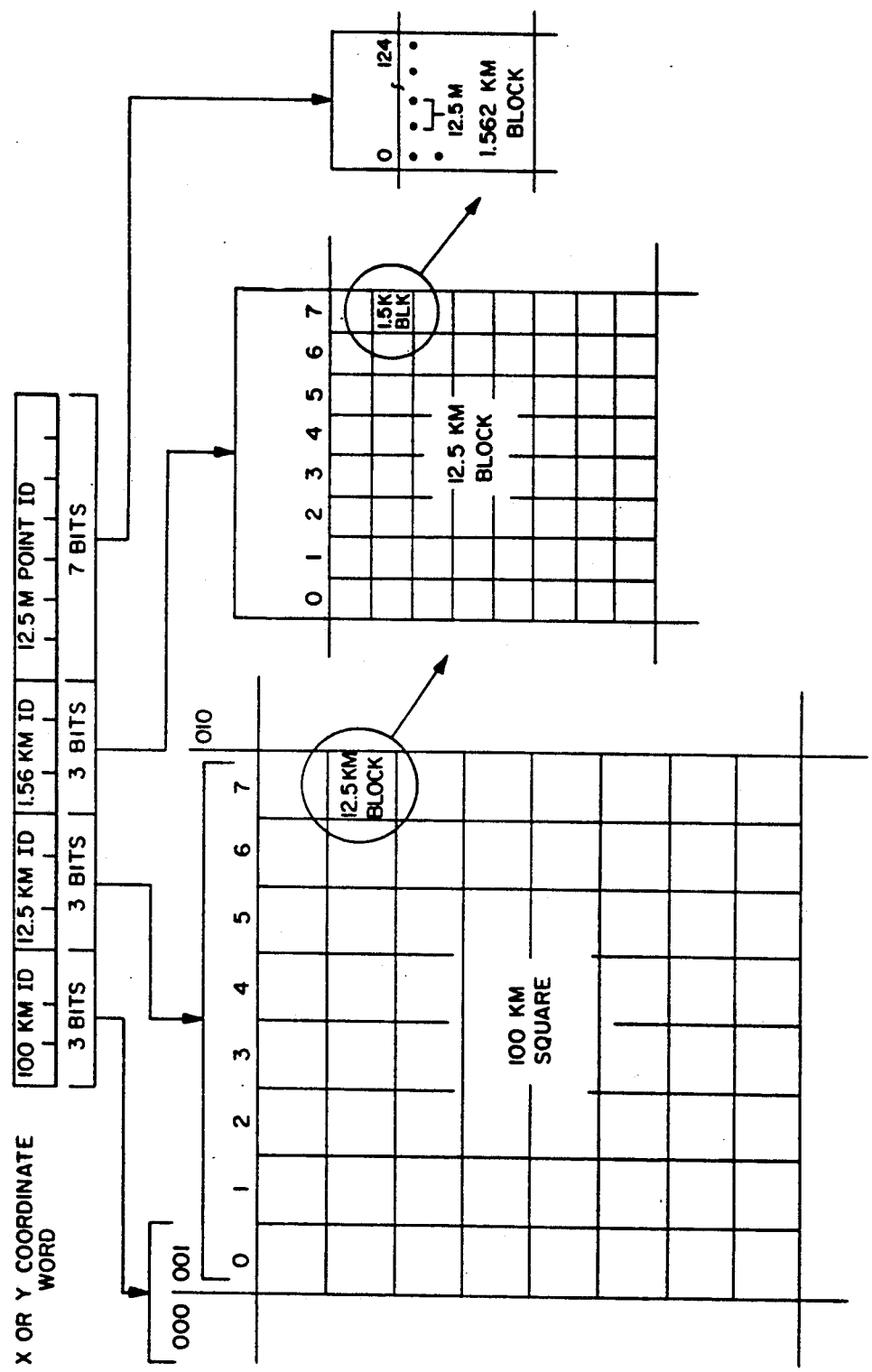
FIG. 2a is a diagram of the coordinate system used in the compression and storage of terrain data in accordance with one example of the present invention.
FIG. 2b is a diagram of the data format as provided on the cassette tape.

FIG. 2 illustrates the internal coordinate system used in accordance with the present invention for the compression and storage of both elevation and cultural terrain data. This coordinate system is based on the Defense Mapping Agency data base which provides elevations on 12.5 meter grid points Overall, the terrain elevation and cultural data is compressed within 12.5 km square areas, which are a submultiple of the 100 km square used on the transverse mercator projection military maps. Thus, the data base is addressed on the basis of 16 bit X and Y coordinate words, each of which provide 3 bits for the 100 km identification, 3 bits for the 12.5 km identification, 3 bits for the 1.56 km identification and 7 bits for identification of the individual 12.5 meter grid points.

While any of a number of well-known transformation algorithms may be utilized to effect compression of the digital data for storage, an effective transform of the desired type is the discrete cosine transform, such as described in the article entitled "A Digital Real Time Intraframe Video Bandwidth Compression System" by H. Whitehouse et al, in the Proceedings of the Society of Photo-Optical Instrumentation Engineers, Vol. 119, pages 64–78, 1977 This algorithm allows smooth contour interpolation for higher display resolutions and provides a substantial data compression over straightforward elevation storage. The proposed transform utilizes the discrete cosine transform (DCT) to transform the grid points along the X axis into coefficients $A_k$ and differential pulse code modulation (DPCM) is used to compress the coefficients $A_k$ calculated for each subsequent line in the Y direction. A 1024 point DCT is used to provide overlap smoothing along the 12.5 km grid edges, and the desired number of coefficients $A_k$ are calculated using the 1000 elevation grid points and 24 smoothing points along the X axis in accordance with the following algorithm:

$$A_k = C \sum_{m=0}^{m=1023} E_m \cos (2m + 1) k \frac{\pi}{2048}$$

where $E_m$ represents the discrete values of elevation. The same coefficients are calculated for each subsequent line of 1024 points in the X direction. Basically, only the difference in the amplitude of each DCT coefficient is stored between the desired multiple of 12.5 m lines in the Y axis direction. The cultural features are stored adjacent to the elevation data for each 12.5 km square of terrain using the same compression technique.

Terrain elevation variations down to a sine wave period of 200 meters are stored with 128 $A_k$ terms calculated for each X axis line, and the low pass filtered $A_k$ outputs are stored in DPCM code for each 100 meters along the Y axis. A high quality transform would use about 4 bits/coefficient difference, with the result that a 100 meter square of terrain elevation data can be stored with as little as 4 bits.

One of the largest capacity mass storage systems available for mobile applications is a cassette tape unit, which is easily capable of providing storage capacities of up to 12 megabits in a single tape. With this in mind, if it is assumed that one-third of the storage capacity of the tape is reserved for conventional cultural data, annotated data, and tape overhead functions such as inter-record gaps, then eight megabits are available for elevation data storage. Conventional grid elevation data, stored as eight bits of data for each 12.5 m grid point, will use the available eight megabits in the form of a square area with 12.5 km per side. The discrete cosine transform compressed data approach may then use the available eight megabits to store a square area of approximately 140 km per side. Thus, it is quite apparent that all of the flight mission data, which includes terrain elevation data, cultural data, flight annotated data, and the respective coordinate identification, can be stored on a single tape providing all of the information relating to a significantly-large area of terrain.

Cultural data may be divided into three distinct groups including linear features, area features and point features. There are two possible methods of storing cultural features on tape. The first method is the conventional method of storing a feature identification word and a feature location word. Linear features may be stored as a sequence of chain encoded line segments, the chain sequence being initiated by identifying a starting point location and the number of segments in the sequence. A series of three-bit code words may then be provided to define each of the eight possible line segments for each segment in the series. Area features may be stored as a series of linear features; however, the line segments would be of programmable length rather than fixed length like the chain encoded segments. This is accomplished by storing all area feature line segments with a single direction, due east, orientation. Symbology and alphanumerics can be stored as point features which have identification and location information. A point feature code may then index a table of pr symbology and alphanumerics for generation.

The second more preferable method of storing cultural features again involves the compression of linear and area cultural data the DCT/DPCM technique. Various basic categories of structural features can be identified for compression with each category being assigned a weighting level Each grid point in the grid data base is then assigned one of the weighting levels, and the weighting levels are then compressed. As an example, weighting levels 0-7 may be assigned respectively to water areas, streams, marsh areas, wooded areas, fields, cleared areas, roads, and built-up areas. In this way, cultural features are defined simply in the same terms as shades of gray are defined for elevation.

Figure 3:
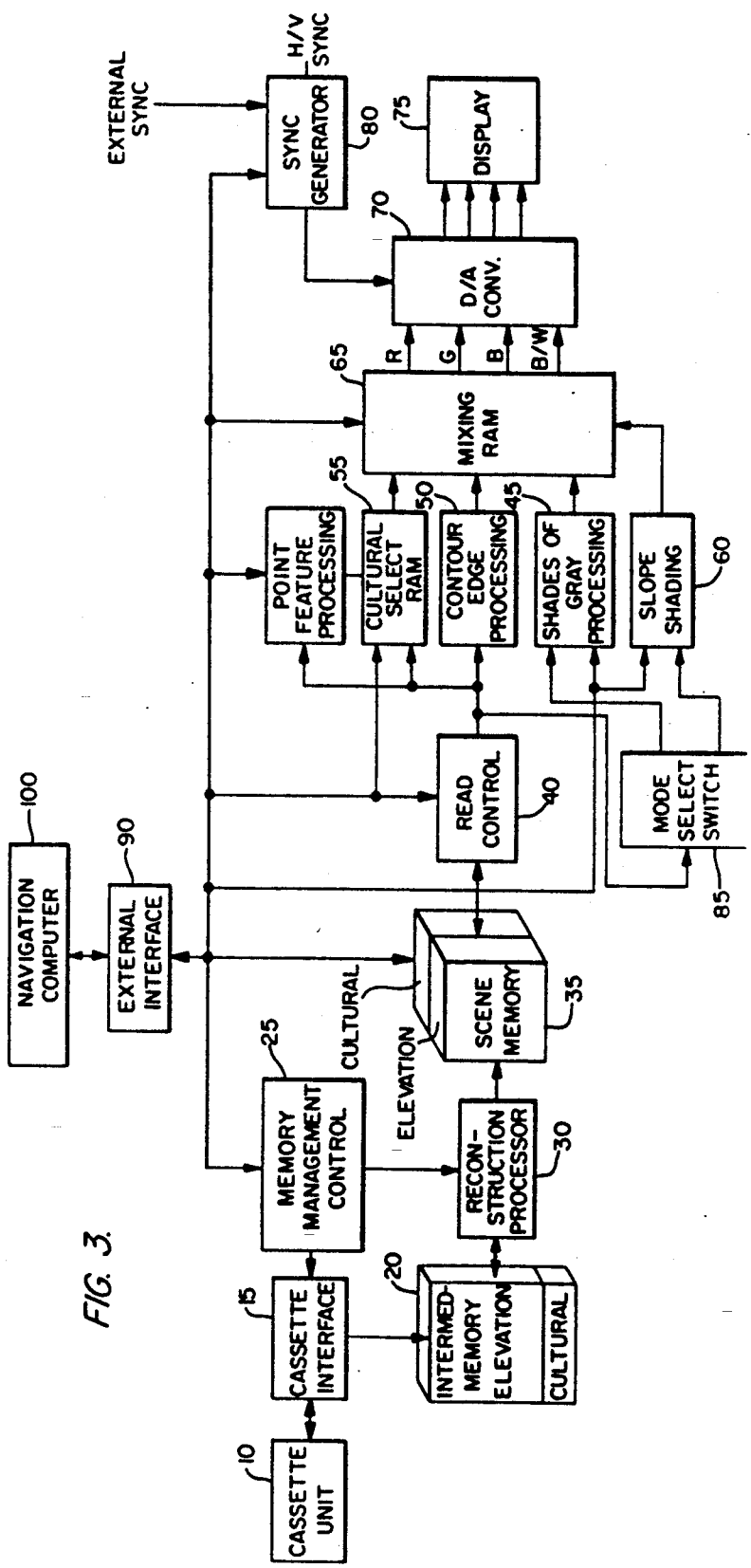
FIG. 3 is a schematic block diagram of a display system in accordance with the present invention.

FIG. 3 is a basic block diagram of a system in accordance with the present invention for the dynamic display of terrain data including both elevation and cultural information for use in the navigation of an aircraft along a predetermined flight path under control of a navigation computer 100 which is connected to the system via interface 90. Prior to flight operation, a cassette tape which stores the properly-formatted mission data is loaded into the cassette unit 10. The mission data, which consists of cultural data, flight annotation data and compressed elevation grid data, is stored on the cassette tape in blocks organized according to their coordinate location in a format such as shown in FIG. 2b. In this regard, the header associated with each block will include the X and Y coordinate addresses of the block made up of the three 100 km I.D. bits and the three 12.5 km I.D. bits, as seen in FIG. 2a.

The output of the cassette unit 10 is applied through a cassette tape control unit 15 to an intermediate memory 20. Since the latency time of the cassette unit 10 (the difference in time between data requisition and data acquisition) can be as much as several seconds, which is clearly beyond the instantaneous response required in the system, the cassette tape unit 10 cannot be used as the primary source for acquiring data for processing. The intermediate memory 20 is therefore provided as the primary data source and the cassette unit 10 supplies data to the intermediate memory 20 as required under control of the tape control unit 15.

The cassette unit 10 will be accessed relative to translatory movement of the aircraft and the maximum cassette tape access rate, under control of the memory management control 25, which is responsive to control signals and data received from the onboard navigation computer 100 in the aircraft. The computer 100 provides various information concerning the aircraft itself, such as altitude, ground speed and heading, in addition to the present coordinate location of the aircraft, which forms an instantaneous "center of display" coordinate for data control within the system.

The tape control unit 15 controls the cassette unit 10 to search the tape and read the mission data corresponding to the "center of display" coordinate received from the navigation computer 100 under control of the memory management control 25, and the required data is loaded into the intermediate memory 20, which provides the fast data access capability required by the system. The memory management control 25 controls the tape control unit 15 so as to ensure that the terrain data stored in the intermediate memory 20 will always be sufficient to support the required processing and resultant display. Thus, the memory management control 25 functions to control both the read and write operations of the intermediate memory 20 and manages the data routing in conjunction therewith.

As indicated, the basic objective of the intermediate memory 20 is to solve the problem concerned with slow serial access of the cassette unit 10. Thus, the intermediate memory 20 acts as a speed buffer memory, inputting data from the slow cassette unit 10 and providing fast output to a data reconstruction processor 30 which serves to reconstruct the compressed elevation and cultural data into the format required for processing and subsequent display. In this regard, in the reconstruction processor 30, the inverse DPCM operation sequentially calculates and stores the 128 DCT $A_k$ values for a horizontal line in the 12.5 km terrain square, and the inverse DCT in turn calculates each elevation and cultural data value required for display in accordance with the equation:

$$E_m = C \sum_{k=0}^{k=127} A_k \cos(2m + 1) k \frac{\pi}{2048}$$

Figure 4:
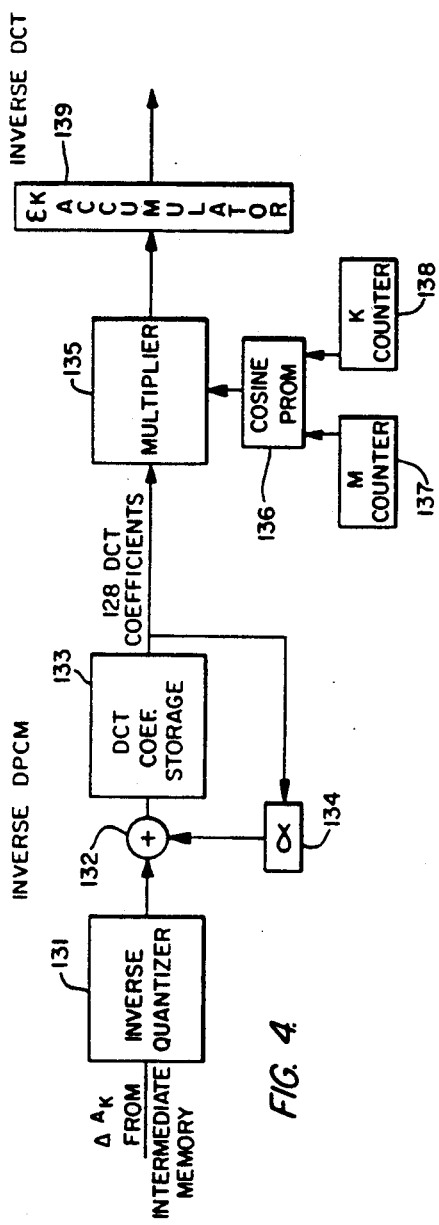
FIG. 4 is a schematic block diagram of a reconstruction processor for operation on DCT/DPCM compressed data.

The details of the reconstruction processor 30 are seen in FIG. 4, which shows the delta coefficient values $\Delta A_k$ from the intermediate memory 20 being applied to an inverse quantizer 131, the output of which is applied through a summing circuit 132 to DCT coefficient storage 133 where the 128 DCT coefficients are stored. A $\alpha$ predictor multiplication factor 134 permits recovery from occasional bit errors. The product of $\alpha$ and the $A_k$ stored in 133 is provided to the input of the summing circuit 132. The reconstruction technique requires 128 multiply/accumulate steps for each data value as performed by the multiplier 135 and accumulator 139. The required cosine values are provided by a PROM 136 associated with an m value counter 137 and a k value counter 138.

The reconstruction processor function 30 is not required continuously, and therefore, under the control of the memory management control 25 will burst read the intermediate memory 20 for discrete changes in the aircraft position. During each burst mode read operation, the reconstruction processor 30 requires approximately 1/16th of the data stored in the intermediate memory 20. The burst read period is approximately 32 ms. and the time between burst reads is approximately 120 seconds, which is based on the time required for the aircraft to translate 12.5 km at ground-estimated speed, for example.

During the 120 seconds between the read operations of the reconstruction processor 30, the cassette unit 10 updates the intermediate memory 20 with cultural, annotated and compressed elevation data in discrete blocks which are 12.5 km per side. The 12.5 km block relates to a 1024 point discrete cosine transform block as utilized in the compression algorithm. The reconstruction processor 30 operates on 12.5 km blocks, consequently it accesses 12.5 km area blocks from the intermediate memory 20. All cultural and annotated data are identified relative to the 12.5 km block of terrain area in which they are located.

Figure 5:
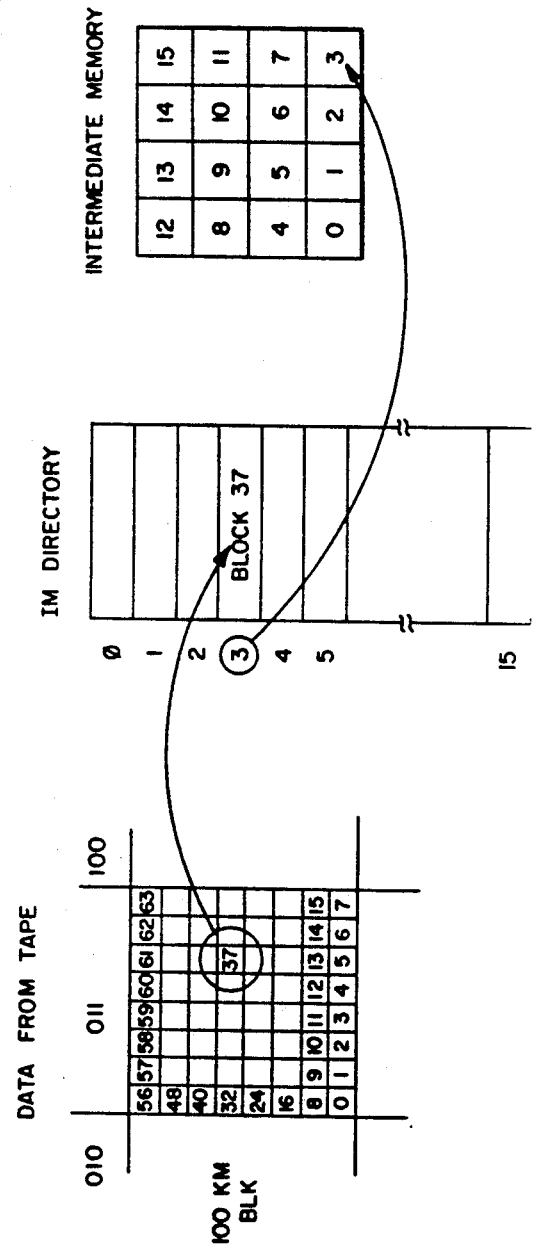
FIG. 5 is a schematic diagram showing the features of the intermediate memory virtual addressing feature of the present invention.

In the preferred embodiment, the terrain area stored in the intermediate memory 20 is a virtual square area of 50 km per side, which consists of sixteen 12.5 km blocks as seen in FIG. 5. The instantaneous center of display coordinate position is always at the center of the 50 km terrain square represented by the data stored in the intermediate memory 20 to within an accuracy of one 12.5 km block, and as the aircraft translates across the terrain, this 50 km data square in the intermediate memory 20 will track the movement of the aircraft causing the scene to change. New 12.5 km data blocks required to update the square are then written over old 12.5 km blocks which are no longer in the square, so that the square will always be made up of an integral number of 12.5 km data blocks and will contain no partial data blocks. However, as a result of such updating of the memory 20, it can be seen that the sixteen blocks and hence the total square will not exist in the memory 20 in a contiguous order related to the actual scene to be displayed, but will be provided in a random order determined by the changing scene requirements. Thus, some means must be provided to keep track of 12.5 km blocks so that they may be later returned to the order in which they appear in the actual scene. To do this, the memory management control 25 utilizes a directory to associate each of the sixteen blocks with a coordinate location and with an intermediate memory address, so that with each request for data by the reconstruction processor 30, the intermediate memory directory of the memory management control 25 will identify the data blocks in the intermediate memory 20 in the order of the actual scene for fast location and access.

As seen in FIG. 5, the intermediate memory directory has sixteen storage spaces 0–15 to accommodate an address for each of the sixteen 12.5 km virtual squares of the intermediate memory. Thus, in the illustrated example, if block No. 37 from a selected 100 km block of data provided on the cassette tape is transferred to the virtual block No. 3 of the intermediate memory 20, the identification for block No. 37 is simultaneously placed in storage space 3 in the intermediate memory directory. In this way, when reading the data blocks out of the intermediate memory 20, translation from virtual addresses to physical addresses can be accomplished merely by referring to the directory.

This virtual addressing scheme provides for extremely-fast updating of the intermediate memory 20 in that it avoids the need to rewrite the entire contents of that memory periodically to accommodate the need for new data from the tape as the aircraft moves over the terrain. New data blocks are simply written over old data blocks without regard to location so that only a fraction of the memory 20 need be updated. Also, with the center of display located near the center of the 50 km square, the 50 km terrain square is of sufficient area to accommodate rapid heading changes without requiring frequent reloading of the intermediate memory 20 for display resolutions of 100 meters per pixel or less.

Figure 6:
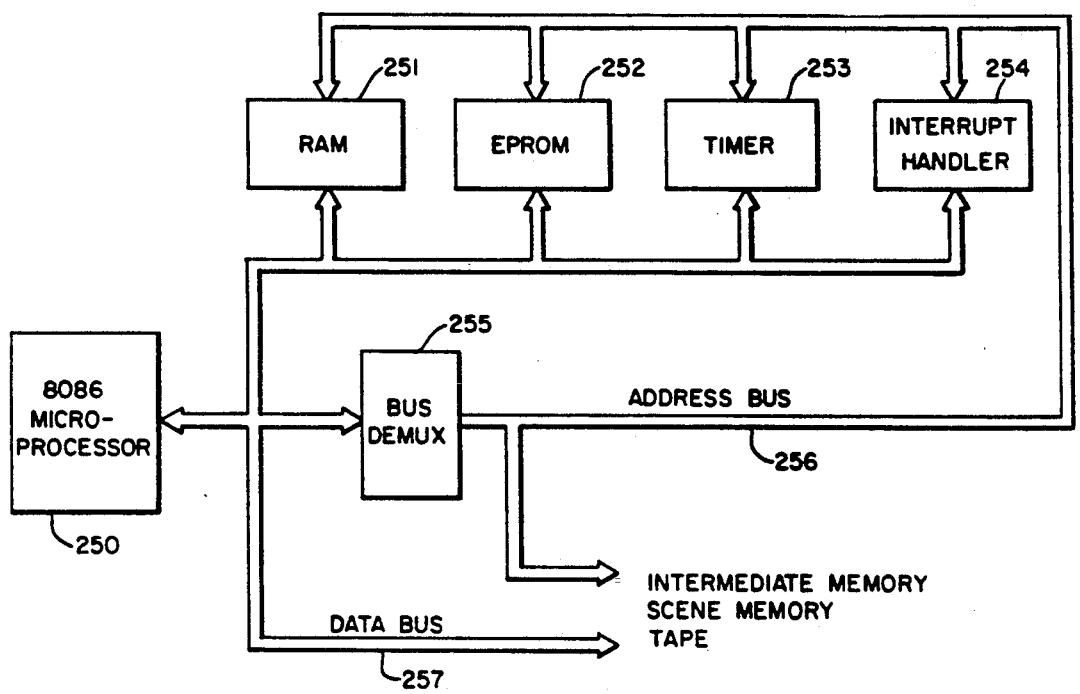
FIG. 6 is a schematic block diagram of the memory management control.

The memory management control 25, as seen in FIG. 6, is a microprocessor system, the heart of which is an Intel 8086 microprocessor 250, which is associated with a random access memory 251, an electronically-programmable read-only memory 252, a timing controller 253 and an interrupt handler 254 linked via an address bus 256 and a data bus 257, which are associated with a bus demultiplexer 255 Both the address bus 256 and the data bus 257 extend to the intermediate memory 20, the scene memory 35, the tape interface 15 and the reconstruction processor 30.

Upon receiving position commands from the navigation computer 100, the memory management control 25 will determine which 12.5 km blocks of data are required to fill out the intermediate memory 20 with the aircraft at the center of display position, and, the tape unit 10 will be controlled via the tape interface 15 to read out the designated data blocks to the memory 20, filling that memory. Then, as the aircraft moves, based on the heading and position data received from the navigation computer 100, the memory management control 25 will determine which new blocks of data will be required from the tape and which old blocks in the memory 20 are no longer needed, and the intermediate memory 20 will be updated to ensure a valid display. At the same time, the reconstruction processor 30 will be controlled to read out data from the memory 20 and reconstruct it to a non-compressed form.

The reconstructed data obtained at the output of the processor 30 is applied to a scene memory 35 which has separate sections for elevation and cultural data. The data reconstruction processor 30 accesses the intermediate memory 20 under control of the memory management control 25 using an address relative to the instantaneous center of display position, under control of the on-board navigation computer 100, and the compressed elevation data is then reconstructed into the elevation format required for processing The data reconstruction interval can be externally selectable at a 1:1, 2:1, 4:1 or 8:1 scale. This reconstruction data is loaded into the scene memory 35 at addresses associated with the center of display location.

The data in the scene memory 35, like the data on the cassette tape in the cassette unit 10 and the data in the intermediate memory 20 has a constant north-up orientation. The cultural data and annotated flight data is stored in a separate section of the scene memory 35 which is also address related to the center of display position. The data which is stored in the scene memory 35 at all times maintains this north-up orientation and is related to the center of display position. In order to convert this data from north-up orientation to a heading-up orientation for display purposes, a read control circuit 40 controls the scene memory 35 to read the data therefrom in sequential rows which are perpendicular to the angular heading of the selected reference location, i.e., the heading of the aircraft at the coordinate location thereof. The scene memory access rate and access format correspond directly to the data rates and format of the subsequent display.

Figure 7:
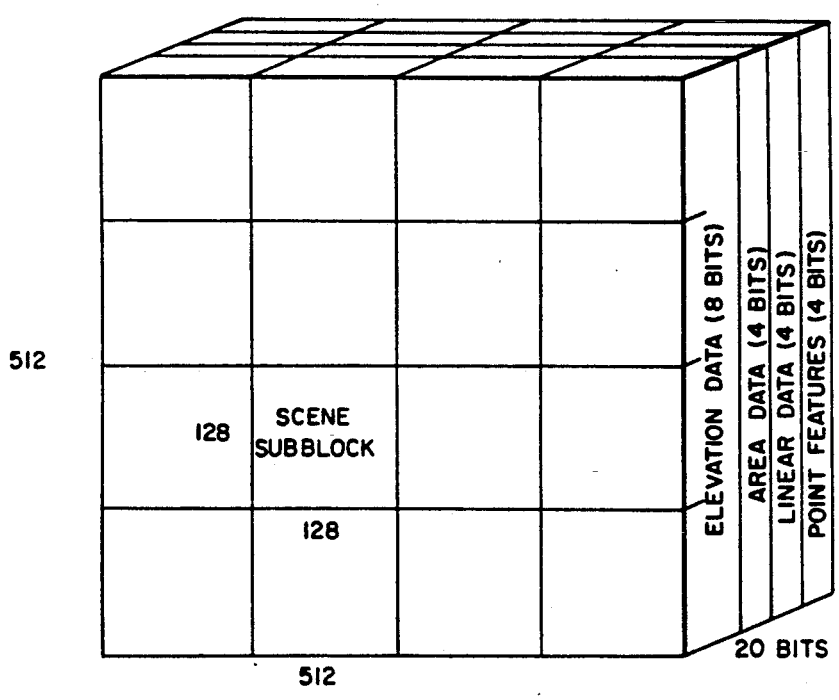
FIG. 7 is a schematic representation of the scene memory map.

The scene memory 35 is divided into sections to allow independent data processing of elevation and cultural data, as seen in FIG. 7. Similar to the intermediate memory 20, the scene memory 35 has a size which is based on a terrain square with the aircraft located near the center thereof, and the size of the terrain square is a function of the range scale selected. Thus, the sides of the terrain square will be 6.4 km for a 8:1 scale and 51.2 km for a 1:1 scale. The elevation data section of the scene memory uses 8 bits per grid point to define the relative elevation. The reference elevation and scale factor are stored with the associated 12.5 km grid square address in an index register forming part of the memory management control 25, i.e., is formed as a register in memory 251.

The scene memory 35, like the intermediate memory 20, also is a virtual memory which is updated by the reconstruction processor 30 as required to guarantee the availability of sufficient scene data for all potential aircraft headings. This is accomplished by adding and deleting discrete blocks of memory as opposed to rewriting the entire scene memory for each change in aircraft position. The discrete blocks of scene memory data have unique absolute addresses; however, the terrain area associated with each block is variable. A directory forming part of the read control circuit 40 is used to relate the southwest corner of each block to a terrain coordinate and to provide an address for the appropriate scene memory location. As the blocks of memory are updated, the directory is changed accordingly in much the same manner as described in conjunction with the virtual addressing of the intermediate memory 20.

The terrain area organization of the scene memory 35 is a function of the display range selected. The data reconstruction processor 30 operates on a 12.5 km square, and therefore the scene memory 35 can be defined by the integral number or fractional portions of a 12.5 km block.

The conventional method of rotating data for a heading-up display is to sequentially access data from a scene or frame memory and write the data at a rotated address in a refresh memory. However, the rotated data in such a system cannot be displayed directly because the rotated series is not aligned with the display horizontal row scan. In accordance with the present invention, this disadvantage is eliminated by accessing the data at selected scene memory addresses to generate a rotated data sequence which is aligned with the display horizontal row scan. The selected access of the scene memory 35 is generated by rotating the scene memory read-out addresses as a function of the aircraft heading.

The following discussion of the rotation and translation operation in accordance with the present invention will be based on the elevation section of the scene memory 35; however, the same explanation also applies to the cultural data section thereof. The elevation section of the scene memory 35 is typically provided as a 512 by 512 by 8 bit memory, as seen in FIG. 7. To address this memory an 18 bit address must be generated which consists of a 9 bit vertical address and a 9 bit horizontal address.

Figure 8:
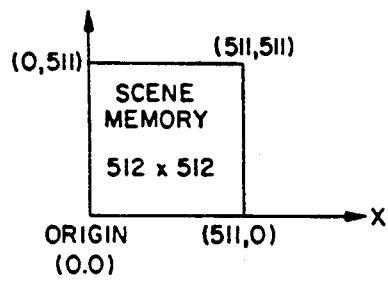
FIG. 8 is a schematic diagram of address coordinate arrangement of the scene memory.
Figure 9:
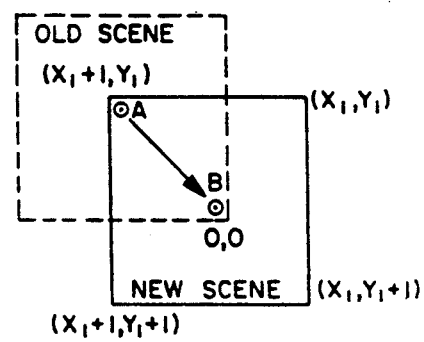
FIG. 9 is a schematic diagram illustrating the changing of scenes in the scene memory.

The memory is organized as one quadrant of an X-Y coordinate plane, as seen in FIG. 8, the origin of which is located initially at the bottom left-hand corner of the square, with X being the horizontal address and Y being the vertical address. As the aircraft translates, the origin will move since the aircraft position $X_L$, $Y_L$ remains near the center of the memory. For example, if the aircraft has translated from A to B, as seen in FIG. 9, the origin changes places. Since all X and Y addresses are 9 bit positive numbers, as these addresses are decremented through 0 or incremented through 511, they simply roll over into the next block of data, and since each location in memory can be identified by an X and Y coordinate, the next point in a rotated sequence, at any angle of rotation, can be calculated from the last point in the sequence using a trigonometric equation based on the aircraft heading.

Figure 10:
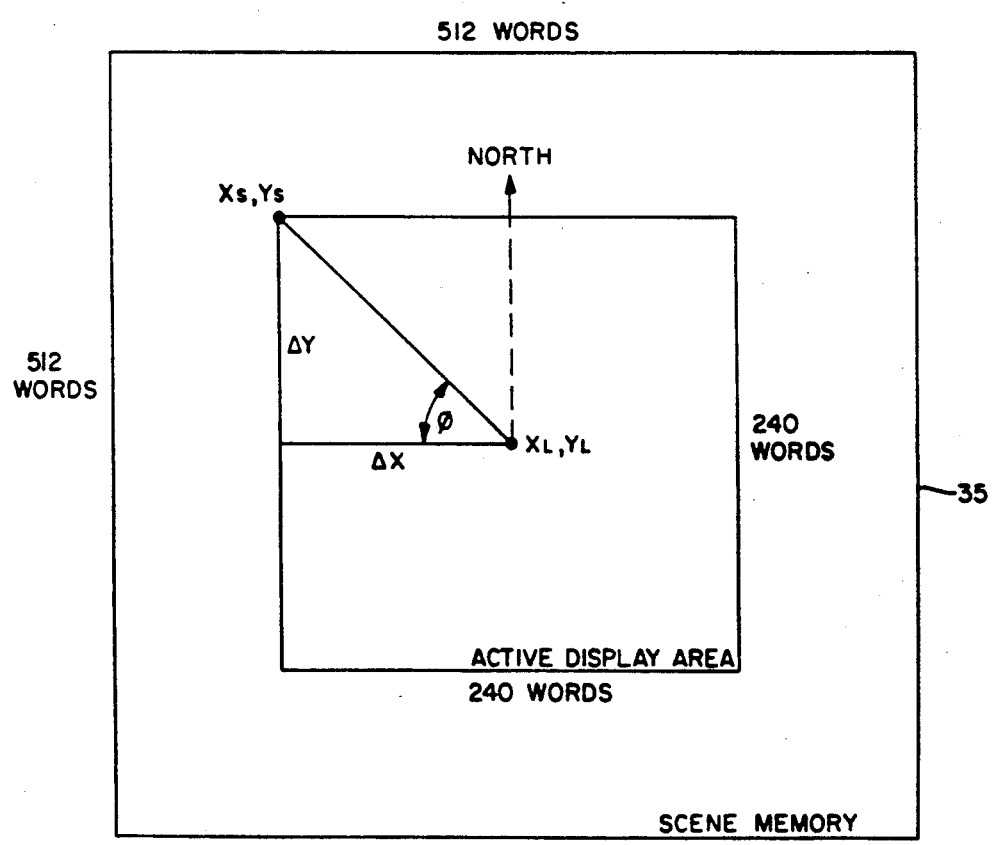
FIGS. 10-13 are schematic diagrams which illustrate the address rotation scheme of the present invention.

FIG. 10 schematically illustrates the scene memory 35 with a half resolution active display area of 240×240 words relative to the of 512×512 words, the size of the active display area being preselected so as to provide sufficient data surrounding that area to permit apparent rotation of the active display area without contacting the boundaries of the scene memory, as will be required for aircraft headings other than true north. At this point it is once again noted that the data stored in the scene memory 35 is never actually rotated in position in that memory, but is always maintained with a north-up orientation. Rather, the active display area only is rotated by proper selection of read-out addresses to accommodate changes in aircraft heading, as will be seen from the following description.

If the aircraft is proceeding in a true north direction so that no rotation is required, the data in the central portion of the memory is addressed during the read-out operation so as to simply select the data which falls within the active display area. This merely requires a determination of the starting point $X_s$, $Y_s$ of the display area and standard horizontal and vertical addressing based on the known size of the area. The initial starting point for the active display area, which has the aircraft position $X_L$, $Y_L$ as a center point, is defined by the following equations:

$$X_s = Y_L - \Delta X = X_L - R \cos \phi$$

$$Y_s = Y_L = \Delta Y = Y_L + R \sin \phi$$

where $\Delta X$, $\Delta Y$ and R are based on the preselected size of the display area, and the position $X_L$, $Y_L$ is provided by the navigation computer.

Figure 11:
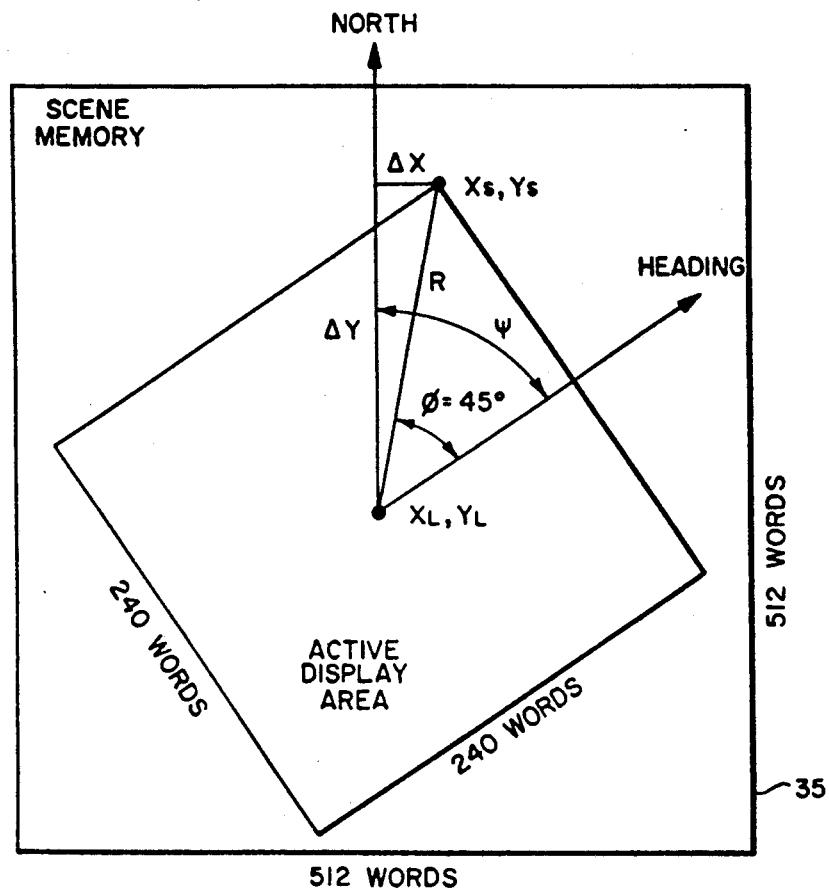

FIG. 11 shows the scene memory 35 with the active display area rotated by an angle $\psi$ from north in accordance with the aircraft heading. Again, the first step in determining the read-out addresses for the rotated area is to calculate the starting point $X_S$, $Y_S$ of the rotated active display area, which forms the first point of the first horizontal sweep of the display.

Once the location of the first point of the first horizontal sweep is calculated, and relative to the first point in every horizontal sweep, every point in each row can be calculated. The starting point $X_S$, $Y_S$ is determined on the basis of the following equations which are derived from FIG. 11:

$$X_s = X_L - \Delta X = X_L - R \sin (\psi - \phi)$$

$$Y_s = Y_L + \Delta Y = Y_L + R \cos (\psi - \phi)$$

Figure 12:
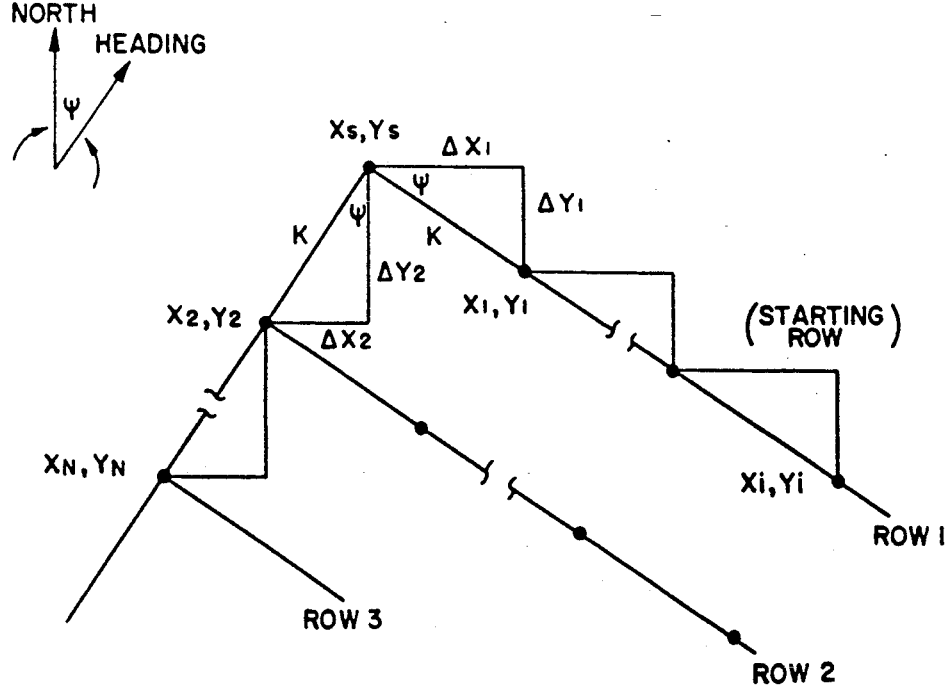

In the same manner, once the rotated starting point of the display area is calculated the individual row points and column points are calculated, as seen in FIG. 12, based on the following equations:

ROW POINTS $$X_1 = X_s + \Delta X_1 = X_s + k \cos \psi$$

$$Y_1 = Y_s - \Delta Y_1 = Y_s - k \sin \psi$$

COLUMN POINTS $$X_2 = X_s - \Delta X_2 = X_s - k \sin \psi$$

$$Y_2 = Y_s - \Delta Y_2 = Y_s - k \cos \psi$$

Figure 14:
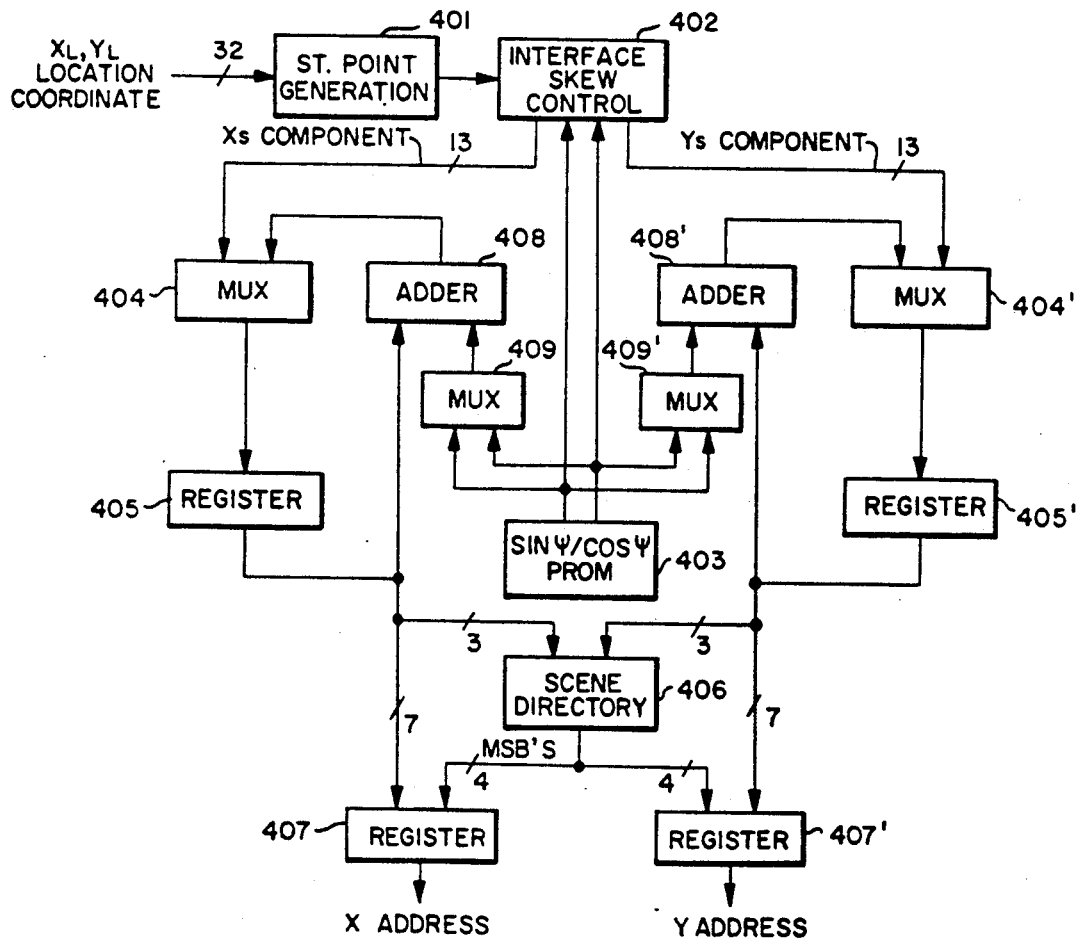
FIG. 14 is a schematic block diagram of the read control.

The read control 40, as seen more particularly in FIG. 14, controls the read addressing of the scene memory 35 on the basis of the rotation scheme described above to ensure that the display data has a heading-up orientation. Once per display field, (1/60th of a second) the aircraft position and heading are sampled, and then the values of $X_S$, $Y_X$, COS $\psi$ and SIN $\psi$ are calculated. The values of SIN $\psi$, COS $\psi$, and R are accessed from a ROM lookup table using the aircraft heading angle $\psi$, which varies from 0 to 360 degrees as the input. To generate $X_S$ and $Y_S$, the present aircraft location is added to the output from the ROM. Using the COS $\psi$ and SIN $\psi$ from the ROM and the last (X,Y) point, the next ($X_1$, $Y_1$) addresses are generated serially. As the addresses are generated, they are used to access elevation data from the scene memory 35.

Figure 13:
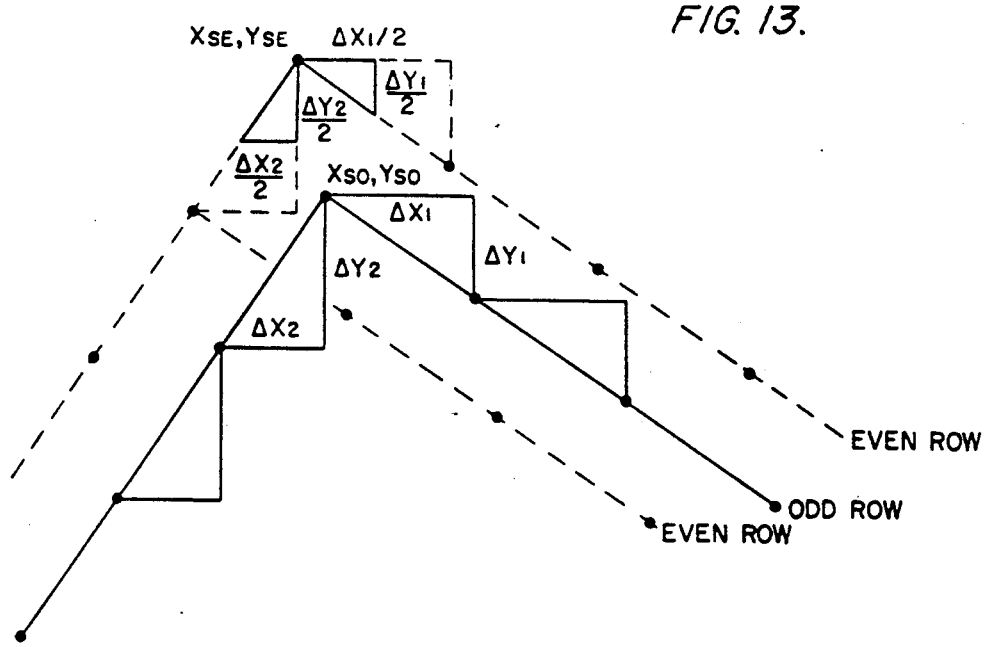

For purposes of increasing resolution and for line smoothing and line enhancement, the active display area of the scene memory 35 is scanned in alternate fields which are skewed or offset diagonally from one another in a form of interlace scanning, as seen in FIG. 13. By skewing the alternate fields, the interlace flicker which tends to occur along horizontal contour lines of high contrast in the picture is considerably reduced. Such flicker occurs in a standard scanning arrangement in conjunction with any contrasting fine line which runs horizontally through a picture since the horizontal pixels are only illuminated in alternate fields. Jitter in the system will cause marginally illuminated pixels to be illuminated at one time and then not illuminated at another time. Such flickering is very distracting to the pilot of an aircraft and is especially troublesome when the lines are rotating or moving.

The problem of contour line flicker is solved in accordance with the present invention by offsetting the scan lines which produce the second or odd field from those of the first or even field, as seen in FIG. 13. The addressing of the active display area of the scene memory for the second field is accomplished in the same way as that for the first field once the offset starting point $X_{SO}$, $Y_{SO}$ is determined for the first line of the field, in accordance with the starting point $X_{SE}$, $Y_{SE}$ of the first field, as follows:

$$X_{SO} = X_{SE} + \frac{\Delta X_1}{2} - \frac{\Delta X_2}{2} = X_{SE} + \frac{k \cos\psi}{2} - \frac{k \sin\psi}{2}$$

$$Y_{SO} = Y_{SE} - \frac{\Delta Y_1}{2} - \frac{\Delta Y_2}{2} = Y_{SE} - \frac{k \sin\psi}{2} - \frac{k \cos\psi}{2}$$

Thus in the scan of the locations of the scene memory the second field addresses are effectively arranged in an array which is generally the same as that for the first field addresses, but the array is offset or skewed to the right and downwardly by a separation effectively corresponding to one-half of the differential between memory locations. In this manner one field is scanned in 1/60th of a second and then the next field is scanned, so that the effectively diagonally-offset addresses may be scanned in order to make a true geometric presentation that the line is located at an angle with the horizontal and not strictly vertical or horizontal. This interlaced scanning technique provides the effect of increasing the resolution of the scan by increasing the size of the array from a 240 element square to what appears to be a 480 element square, but in fact the system merely provides two offset 240 squares interlaced, so that the effective address locations are reoriented to more favorably portray non-vertical and horizontal lines.

In combination with this interlaced scanning feature, the present invention provides for increased reaction of the display with the use of a line thinning technique in which respective right or left halves of each pixel are selectively illuminated using the interlaced scanning control. In describing this feature, reference is made to FIGS. 13A to 13C, which show how a line segment made up of pixels a, b, c, d and e is smoothed and thinned in accordance with the present invention.

Figure 13A:
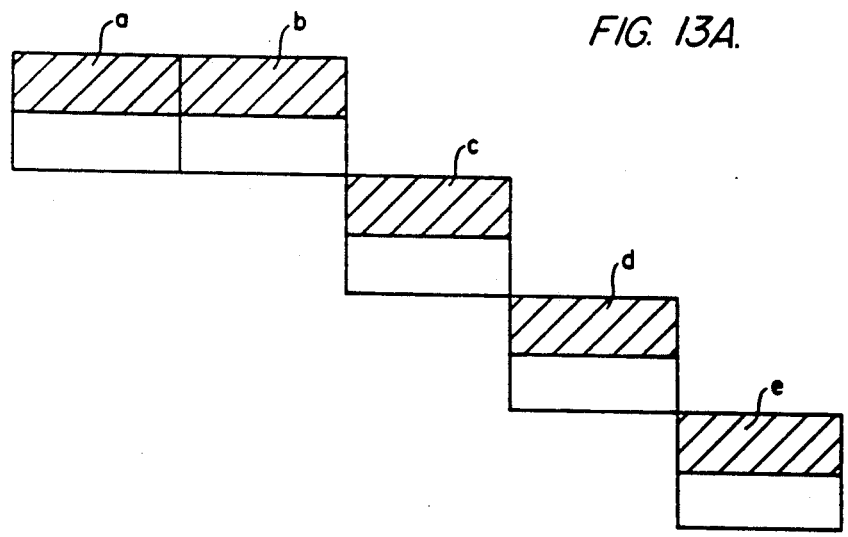
FIGS. 13A-13C are diagrams showing the line thinning and smoothing features, of the present invention.
Figure 13B:
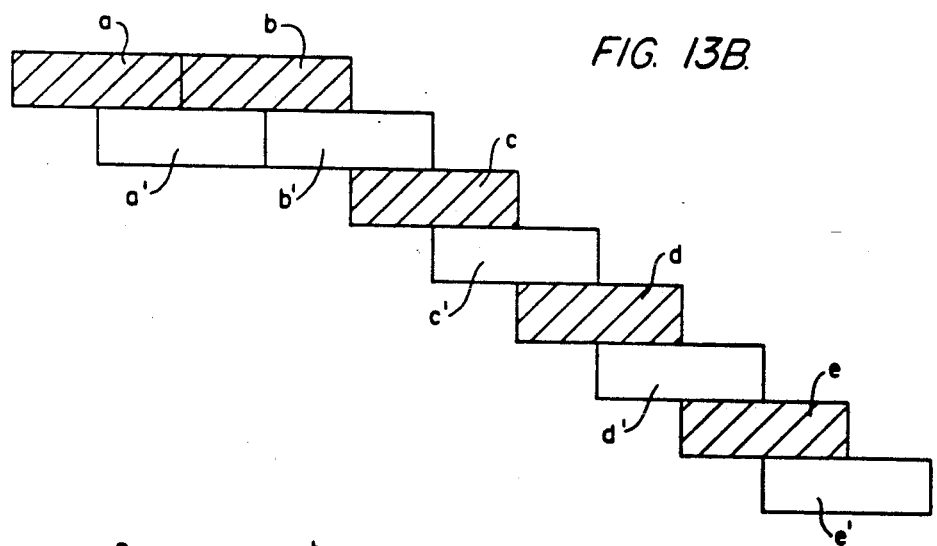
Figure 13C:
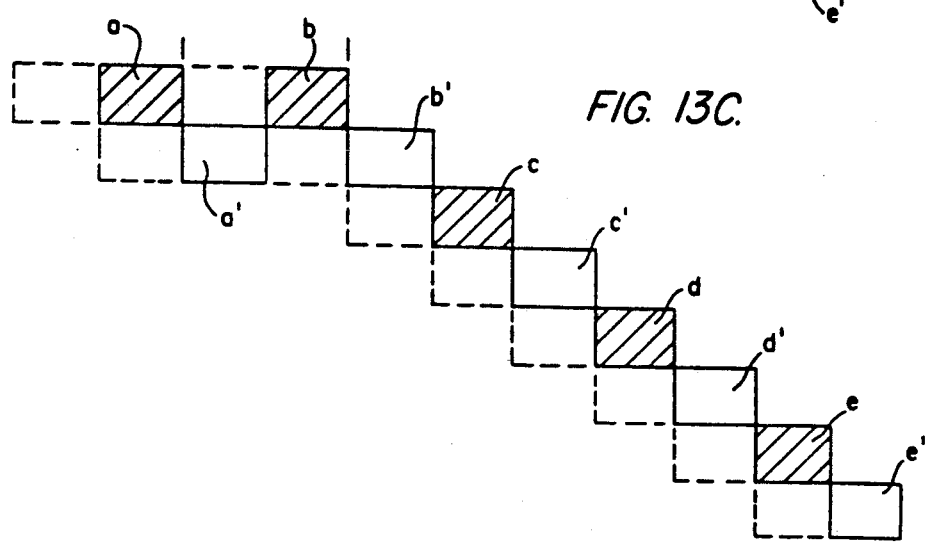

First of all, it will be recalled that each horizontal line read from the scene memory will consist of 240 data values, while in the vertical direction, due to the interlace, the two fields will provide 480 data values. Thus, on the display each pixel will be elongated in the horizontal direction, as seen in FIG. 13A, which shows a line segment made up of half resolution pixels a–e in which the line segment is represented by the shaded portions of the pixels. When line smoothing is performed using interlaced scanning with the pixels a'–e' of the second field being shifted by half a pixel in the horizontal direction, the result is as seen in FIG. 13B. As seen in FIG. 13C, the line created by the pixels a-e being illuminated can be substantially reduced in thickness by illuminating only one-half of each pixel.

The use of interlaced scanning with offset pixel frames, as shown in FIG. 13B, in combination with the line thinning technique of illuminating only one-half of each of the pixels, as seen in FIG. 13C, produces a line smoothing appearance and function which increases the resolution of a slanted line, reduces the thickness of the line and eliminates the interlace flickering which occurs when the scene is rotated or the line moves, due to signal processing ambiguities.

The illumination of only one-half (horizontal left or right half) of the pixel can be controlled simply by strobing the intensity of the electron beam for either the first half or the last half of the pixel as the electron beam scans horizontally across the screen. In this regard, it is possible to illuminate the left half of one pixel on the primary scan and the second half of the pixel on the interlace scan. This again gives a continuous diagonal representation of the type which is not capable of being represented on strictly aligned horizontally and vertically oriented interlaced pixels.

FIG. 14 illustrates the read control circuit 40 which generates the X and Y addresses for reading data from the scene memory 35 with a heading-up orientation in even and odd interlaced diagonally-offset fields. As can be seen, the circuit 40 provides a symmetrical arrangement for generating the respective X and Y addresses, and so, only that portion of the circuit relating to X address generation will be specifically described to avoid redundancy.

In order to generate the starting point addresses $X_S$ and $Y_S$, a starting point generation circuit 401 is supplied with the location coordinates $X_L$, $Y_L$ and the heading angle $\psi$ from the navigation computer 100. The calculation performed by the circuit 401 is as described in conjunction with FIGS. 10 and 11, with a new starting point being calculated each 1/60th of a second. The starting point coordinates $X_S$, $Y_S$ are then supplied to the interlace skew control 402 which serves to generate the even and odd field starting point $X_{SE}$, $Y_{SE}$ and $X_{SO}$, $Y_{SO}$, as described in conjunction with FIG. 13, on the basis of stored values of k sin $\psi$ and k cos $\psi$ derived from PROM 43. A simple counter (not shown) provides for switching between even and odd fields in the control 402.

The starting point $X_S$ in the X direction is supplied at the beginning of the frame scan via multiplexer 404 to a register 405 which stores that coordinate for calculation of the next data point address, and at the same time passes this coordinate on to a scene directory 406 and a register 407. The scene directory 406 receives the most-significant bits of the coordinate stored in the register 405 as a virtual address and operates to read out the absolute address of the proper block of data in the scene memory 35 in accordance with the virtual addressing scheme already described. This output of the scene directory 406 is appended to the least-significant bits of the $X_S$ coordinate stored in the register 407 to provide the X address for the first data value to be read out of the scene memory 35.

In the calculation of each successive data value coordinate along the line, the value of k sin $\psi$ or k cos $\psi$ is supplied via multiplexer 409 to one input of an adder 408, to the other input of which there is supplied the contents of the register 405. The output of adder 408 is then supplied via multiplexer 404 to register 405 where it is stored as the new coordinate. Thus, for calculating successive points along the line and the starting points of successive lines, the contents of register 405 are merely looped successively through the adder 408, providing for very simplified address generation at high speed. The generation of the Y component of the address by the elements 404', 405', and 407' through 409' occur in the same way.

Referring once again to FIG. 1, the elevation and cultural processing section of the system consists of a shades of gray processor 45, a contour edge processor 50, a cultural selection RAM 55 and a slope shading circuit 60 all connected to receive the data read out from the scene memory 35 via the read control circuit 40. These processors will independently generate three types of data for display: shades of gray data, contour edge data, and cultural data. The shades of gray and contour edge data will be based on elevation band partitioning, an elevation band being defined as all the elevation values between an upper and a lower elevation limit, while two independent elevation bands are identified for shades of gray and contour edges, respectively. The shades of gray bands are displayed, for example, as one of eight shades of gray, while contour band edges are contrast highlighted.

As an alternative to the shades of gray approach, the system is capable of selectively providing control of display intensity as a function of slope rather than as a function of elevation. For this purpose the elevation data may be selectively routed to a slope shading circuit 60 by a mode select switch 85 under control of the pilot of the aircraft.

Figure 15:
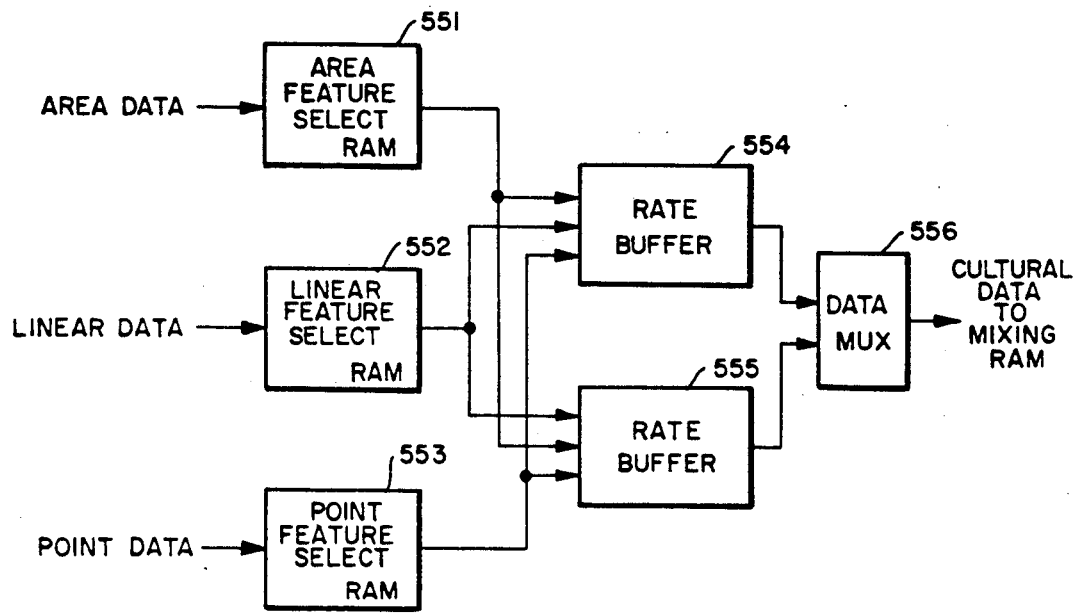
FIG. 15 is a schematic block diagram of the cultural select circuit.

The cultural data selector 55 allows display of any subset of the scene memory cultural data set. The flight annotated data will be defined as a subset of the cultural data set, and can be individually selected by the cultural data selector 55. As seen in FIG. 15, the cultural select circuit is made up of an area feature select RAM 551, a linear feature select RAM 552 and a point feature select RAM 553, all of which are addressed by data read out of the cultural portion of the scene memory 35. The memories 551–553 supply cultural data signals via buffers 554 and 555 to a data multiplexer 556, which provides the cultural data output.

Mixing RAM 65 is a RAM array which is programmed with digital codes representing the mixing of a point's shade of gray assignment with its cultural feature color assignment. The address input to the mixing RAM 65 during display generation is the concantenation of the shade of gray assignment (selected from either the shades of gray processor 45 or the slope shade processor 60), contour bit assignment, and the culture feature assignment. The four output links from mixing RAM 65 respectively represent the relative intensities of red, green, blue to be displayed on a color CRT or, alternatively, the black/white intensity to be displayed in the monochrome mode. These outputs are coupled to digital-to-analog converter 70 which is comprised of four conventional vide digital-to-analog converters. When controlled by sync generator 80, these digital-to-analog converters generate the drive signals which produce the moving map on display 75.

As indicated, a major objective of the present invention is to effectively identify changes in terrain elevation for the pilot of the aircraft. Shades of gray levels and contour edge lines are two methods utilized by the processor 45 to provide this identification. The shades of gray approach assigns unique shades of gray levels to preprogrammed elevation bands, which are identified by a maximum elevation and an elevation bandwidth, both of which are programmable. Starting with the maximum elevation, the shades of gray band numbers are consecutively assigned throughout the elevation range and a shade of gray level number is assigned to each band.

Figure 18:
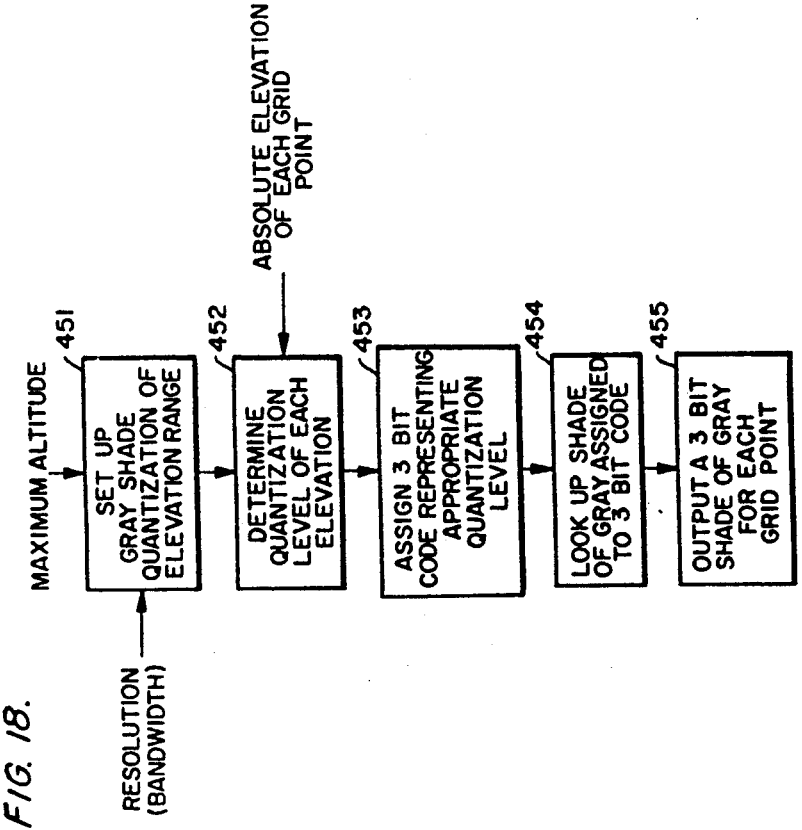
FIG. 18 is a flow diagram of the shades of gray selection process.

Thus, as seen in FIG. 18, the gray shade quantization of elevation range is first set up at block 451 in response to the predetermined maximum altitude and the resolution (bandwidth). A determination is then made at block 452 of the quantization level of each elevation value in response to signals from the scene memory 35 representing the absolute elevation of each grid point. At block 453 a three-bit code representing the appropriate quantization level for each elevation value is assigned, and at block 454 the shade of gray to each three-bit code is looked-up to produce an output at block 455 for each grid point.

On the display, a contour edge consists of a contrasting shade of gray line, one or two pixels in width, which identifies a specific elevation level. The contour edges are externally identified by a reference elevation and a contour interval. A contour edge line will be generated at the reference elevation and at every elevation which is an integral interval above or below the reference elevation. The system generates the shades of gray and contour edge data during read-out of the scene memory 35. Each elevation point exists in one of a multiple number of potential contour intervals. If adjacent elevation points exist in different intervals, then one of the two elevation points is assigned the contour edge bit. The elevation point selected is the point having the least elevational magnitude difference relative to the pertinent contour line elevation. The contour line decision is made on a grid elevation point basis relative to the four adjacent grid elevation points.

Figure 19:
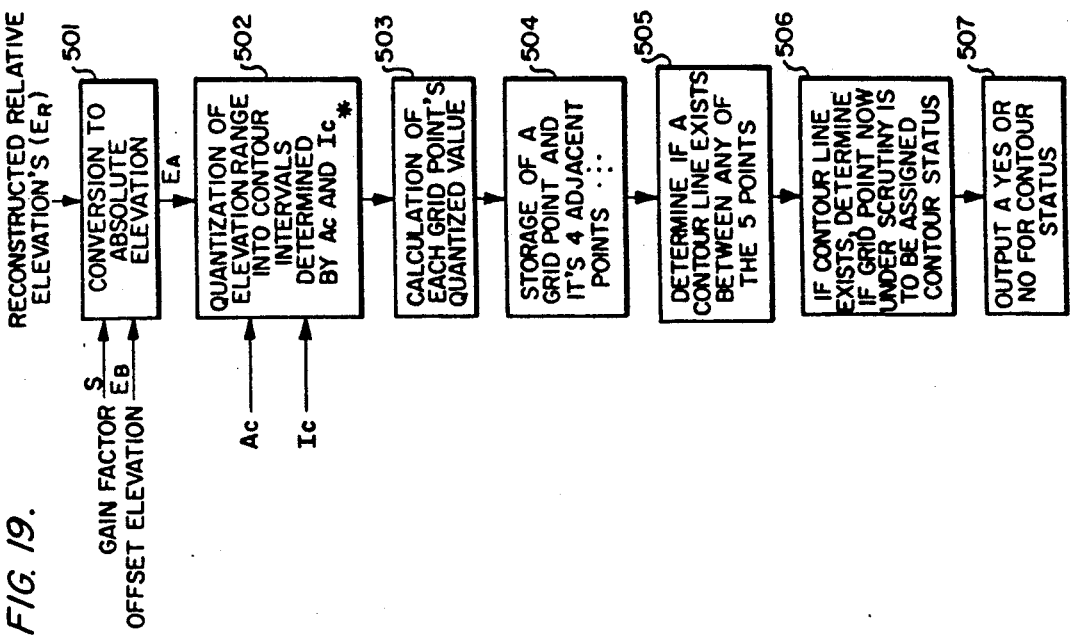
FIG. 19 is a flow diagram of the contour level selection process.

Thus, as seen in FIG. 19, the contour edge processing begins at block 501 with a conversion of the reconstructed relative elevation $E_R$ as received from the scene memory 35 to an absolute elevation $E_A$ in accordance with the following relationship:

$$E_A = E_R S + E_B$$

where S is the gain factor and $E_B$ is the offset elevation. An elevation $A_C$ in meters representing a reference contour line location is received at block 502 along with a predetermined contour width $I_c$ which represents the distance in meters away from the reference elevation at which the next contour line is to appear, i.e., the contour interval width. Then, processing of each data point is effected in accordance with the relation $E_A - A_C/I_c$. The criteria used to determine which pixels, corresponding to respective data points in scene memory, are used to darken or color as contour lines is as follows:

1. Are any two adjacent data points located in different contour intervals?
2. If yes, assign contour edge status to the pixel corresponding to the data point of interset that is closest to the mathematical position of the contour line. As seen in FIG. 19, in block 503 the quantized value of each grid point is calculated, and this value along with the values of the four points adjacent thereto are stored in block 504 so that each data point may be compared to its adjacent data point. In block 505 a determination is made if a contour line exists between any of the five stored points, and, if a contour line exists, a determination is made in block 506 as to whether the grid point under scrutiny is the closest to the contour line. If it is, a signal will be generated at block 507 designating that the associated with that data point be displayed as part of the contour line; if not, the next data point is processed.

To perform the shades of gray decision and the contour line decision in the fastest time, a parallel processing approach is utilized. A contour table is introduced as the major element in the shades of gray and the contour line processors 45 and 50, the respective contour tables containing pertinent shades of gray and contour line data as preprocessed information which will permit high-speed processing. The preprocessed information consists of contour interval number, elevation difference to least-adjacent upper interval edge, elevation difference to least-adjacent lower interval edge, and shades of gray level for every elevational value. As each lelevation is accessed from the scene memory 35, it is combined with the associated scale factor and reference elevation and is used as the address for the contour table. The contour table outputs, for the elevation points which make up a display horizontal row, are stored to allow contour comparisons with the net-adjacent row. After four adjacent points are processed, as seen in FIG. 6, point A is complete and can be output to the line smoothing function and mixer. Using a three bit binary code, eight shades of gray can be identified and a fourth bit can be used to indicate contour edges.

The contour table is generated each time a new set of contour edge or shades of gray requirements are updated. The contents of these tables are determined by the externally-selected contour edges and shades of gray data and by the terrain data scale factors and reference elevation ranges. The addresses to the contour table are absolute elevations. During the contour table update period, the display will be a mixed set of both the old and new table.

Rather than the control of intensity in accordance with assigned shades of gray as provided by processor 45, the output of the scene memory 35 may be selectively applied to a slope shading circuit 60 under control of a mode select switch 85 to control display intensity as a function of slope, with the sum fixed relative to the display screen as the display and vehicle rotate to prevent optical illusions. As seen in FIG. 1, slope shading is particularly effective since it gives an apparent three dimensional effect to the display.

In providing the slope shading feature, the perceived brightness B of the display is controlled in accordance with the following relationship:

$$B = \frac{\partial f}{\partial x} \sin \psi_s + \frac{\partial f}{\partial y} \cos \psi_s$$

where $$\frac{\partial f}{\partial x}$$

is the slope of the terrain in the X (East) direction, $$\frac{\partial f}{\partial y}$$

is the slope of the terrain in the Y (North) direction and $\psi_s$ is the position of the sun relative to North.

Figure 16:
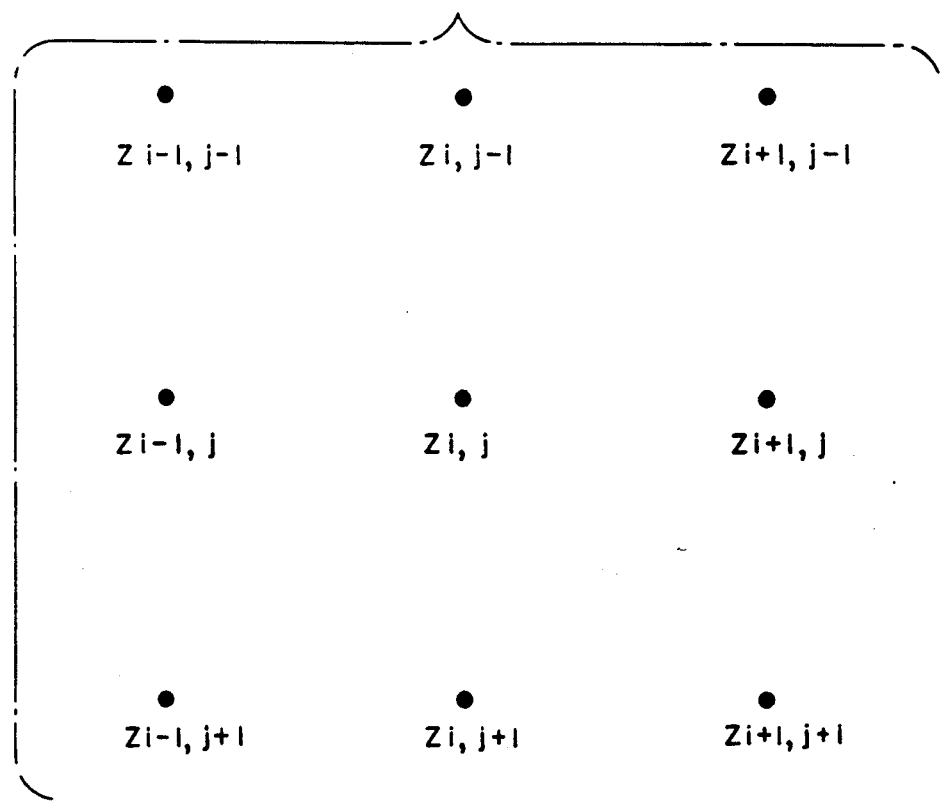
FIG. 16 is a diagram of a block of elevation values for use in explaining the slope shading operation.

Considering an area comprising a block of nine adjacent data points, as seen in FIG. 16, the determination of slope in the X and Y directions can be made approximately on the basis of the following relationships:

$$\frac{\partial f}{\partial x} = \frac{1}{6} [(Z_{i+1,j-1} - Z_{i-1,j-1}) + (Z_{i+1,j} - Z_{i-1,j}) +$$

$$(Z_{i+1,j+1} - Z_{i-1,j+1})]$$

$$\frac{\partial f}{\partial y} = \frac{1}{6} [(Z_{i+1,j-1} - Z_{i+1,j+1}) + (Z_{i,j-1} - Z_{i,j+1}) +$$

$$(Z_{i-1,j-1} - Z_{i-1,j+1})]$$

Figure 17:
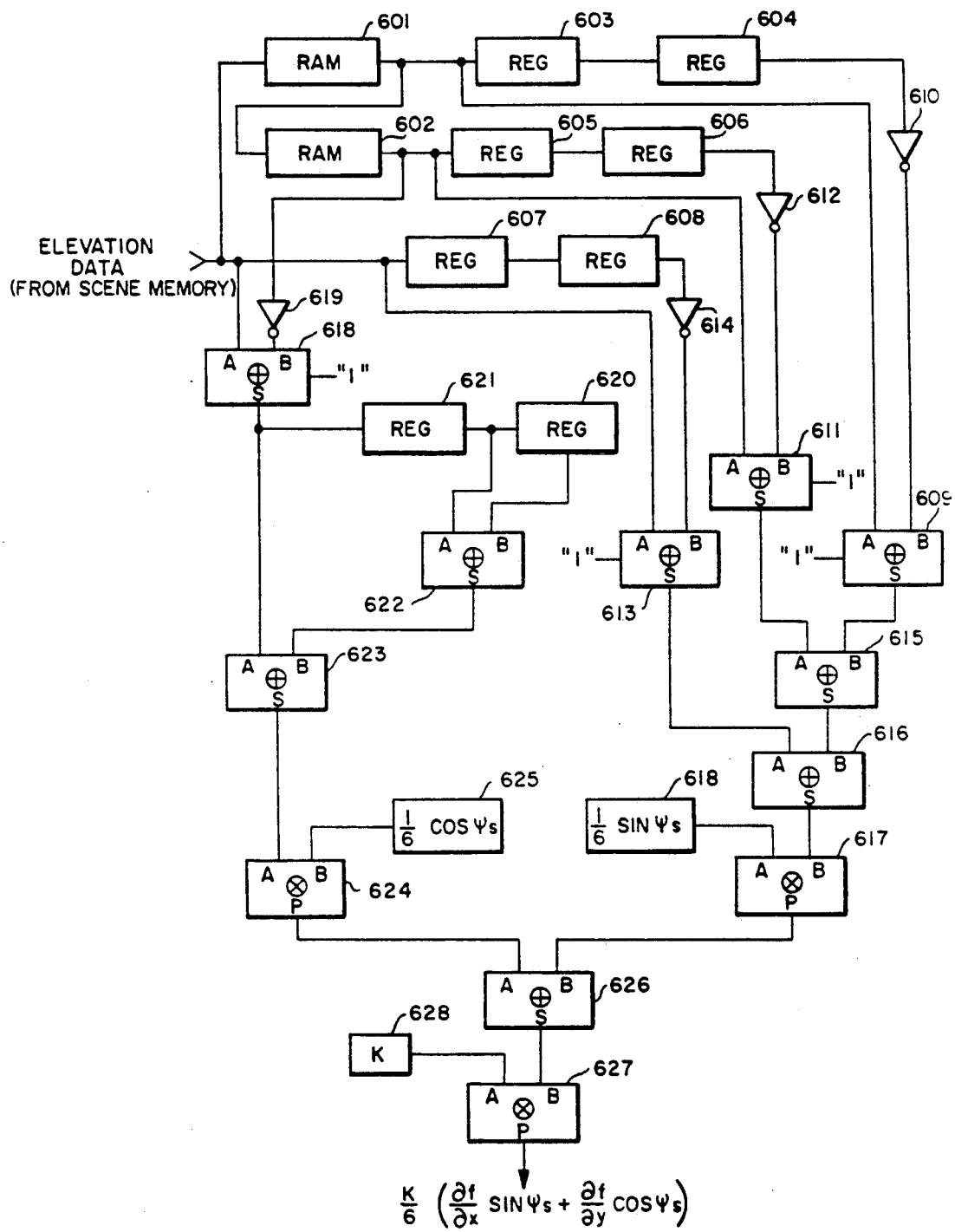
FIG. 17 is a schematic block diagram of the slope shading circuit.

The slope shading circuit 60, as seen more particularly in FIG. 17, logically operates on the basis of the foregoing relationships in response to elevation data received from the scene memory 35.

As seen in FIG. 17, successive values of elevation are supplied to a storage arrangement consisting of RAMs 601 and 602 and registers 603–608, which are connected in correspondence with the data pattern of FIG. 16 to receive and store the elevation data for the block of data points. Thus, adder 609 will receive the values $Z_{i+1,j-1}$ and $Z_{i-1,j-1}$ from the RAM 601 and from the register 604 via inverter 610; adder 611 will receive the values $Z_{i+1,j}$ and $Z_{i-1,j}$ from RAM 602 and from register 606 via inverter 612; and, adder 613 will receive the values $Z_{i+1,j+1}$ and $Z_{i-1,j+1}$ from the circuit input and from register 608 via inverter 614, respectively. The outputs of adders 609 and 611 are summed by adder 615 and the result is summed with the output of adder 613 by an adder 616 to produce $$\frac{\partial f}{\partial x}.$$

The output of adder 616 is then supplied to one input of a multiplier 617, the other input of which is connected to a signal source providing a signal of value $1/6 \sin \psi_s$.

The determination of $$1/6 \frac{\partial f}{\partial y} \psi_s$$

is obtained in a similar way. Adder 618 will receive the current value of elevation at the input of the circuit and a previous value delayed by six data points via inverter 619 from the output of RAM 602. In this way adder 618 produces a first value $(Z_{i+1,j-1} - Z_{i+1,j+1})$, a second value $(Z_{i,j-1} - Z_{i,j+1})$ and a third value $(Z_{i-1,j-1} - Z_{i-1,j+1})$ in succession as the elevation data is being read into the circuit. The first value is then stored in register 620 and the second value is stored in register 621. Adder 622 sums the outputs of registers 620 and 621 and supplies its output to one input of an adder 623 which receives the third value at its other input from adder 618 to produce an output equal to $$\frac{\partial f}{\partial y}.$$

A multiplier 624 receives the output of adder 623 and a signal of value $1/6 \cos \psi_s$ from signal source 625, and the output of adders 624 and 617 are summed by adder 626. A multiplier 627 then receives the output of adder 626 and a signal value equal to the inter-data-point spacing K from source 628 to produce a display intensity control signal as a function of slope.

Area features, linear features, and point features are the three major categories of cultural features. Each of the three categories contain multiple features which are grouped together based on their general characteristics. Area features can be defined as cultural features which occupy multiple surrounding grid points on a map. Examples of area features are swamps, marshes, lakes, forrests, and populated areas. Each example can be further divided into subgroups; for example, forests can be further divided into types of trees and populated areas into density levels. Considering all the possible area features, and subgroups of each feature, the total quantity of area features can be substantially large.

A point feature is a cultural feature which can be identified by a limited number of grid points in a specific pattern. Examples of point features are symbols such as churches, bridges, airports or alphanumerics such as numbers, characters or labels. The basic tape storage mechanism for point features is to store a location code and an identification code juxtaposition to the 12.5 km elevation data in tabular form. The identification code is used as the input to a point feature generation memory RAM 553, as seen in FIG. 15, which is under real time program control. Any point feature can be assigned to any identification code by programming the desired dot matrix sequence in the generation memory at the address assigned to the pertinent identification code.

Potentially, a linear, area and point cultural feature can be identified for a single grid point. The capability of selectively displaying any combination of the three major features and the ability to selectively display any combination of the multiple features within each major feature is a versatile approach to generate an effective map display. The pilot can select a display data set which will increase his mission effectiveness. This is accomplished in accordance with the present invention through the use of the three read/write memories 551-553, as seen in FIG. 15, which will be under real time program control. One memory is dedicated to each of the three types of cultural features, and for each memory the N bit digital code which defines the feature will be the address for the memory. The output of the memory for any feature address will be either the same digital code as the address or will be all zeros. If the output code is equal to the address, the feature has been selected for display; whereas, if the output code is all zeros, the feature will not be displayed.

There are six types of information which can be used to identify each data point. The information types consist of contour edge, shades of gray, annotated data, linear features, area features and point features. A data point can be identified by more than one information type. As an example, a data point is always a shade of gray, and can also be a contour edge, an area feature and a dot matrix point feature of a character. The digital code which is presented to the digital-to-video converter 70, as seen in FIG. 1, is the mixed code of all the information types for the data point.

While a specific example has been given of a preferred embodiment of the present invention, it should be apparent that the basic principles of the invention may be implemented in other forms than that specifically described and illustrated herein. In addition, the system is obviously not limited to the guidance of aircraft, but is also equally useful in the guidance of over-land and other vehicles, as well as for flight simulation of the type used in aircraft trainers.

While I have shown and described several embodiments in accordance with the present invention, it is understood that the invention is susceptible of numerous changes and modifications as known to one of ordinary skill in the art, and I therefore do not wish to be limited to the details shown and described herein but intended to cover all such changes and modifications known to those of skill in the art.

What is claimed is:

1. A digital information storage and read-out system for use in simulating a moving map display of terrain data by selectively energizing a matrix of pixels of a video display, comprising:
    a scene memory having a plurality of storage locations representable as a spatial matrix of storage locations associated with the matrix of pixels of said video display and storing therein digital data representative of information to be displayed which includes at least one line segment;
    read-out means for generating read-out addresses to be applied to said scene memory for reading out digital data therefrom, including means for controlling the read-out of data from said scene memory by addressing storage locations such that said spatial matrix of storage locations is scanned in first and second interlaced fields which are effectively offset in mutually orthogonal directions by one half the separation between storage locations of said spatial matrix;
    processor means for generating display control signals in response to the data read out of said scene memory by said read-out means; and
    line display control means for restricting energizing of those pixels forming said line segment to a first directional half or a second directional half of a pixel to effect the thinning of a displayed line.

2. A digital information storage and read-out system as defined in claim 1, wherein said line display control means includes means for controlling the generation of said display control signal by said processor means so that only half of those pixels forming said line segment will be displayed.

3. A digital information storage and read-out system as defined in claim 1, wherein said display means includes a display device for displaying the data, and said line display control means includes means for strobing the display device so that only half of those pixels forming said line segment will be displayed.

4. A digital information storage and read-out system as defined in claim 1, wherein said processor means includes means for generating said display control signals effectively in real time with the reading out of digital data from said scene memory by said read out means.

* * * * *